US007352862B2

(12) United States Patent
Kurashima et al.

(10) Patent No.: US 7,352,862 B2
(45) Date of Patent: Apr. 1, 2008

(54) ENCRYPTION METHOD, COMMUNICATION SYSTEM, TRANSMISSION DEVICE, AND DATA INPUT DEVICE

(75) Inventors: Shigemi Kurashima, Shinagawa (JP); Norio Endo, Shinagawa (JP)

(73) Assignee: Nagano Fujitsu Component Limited, Nagano (JP)

( * ) Notice: Subject to any disclaimer, the term of this patent is extended or adjusted under 35 U.S.C. 154(b) by 891 days.

(21) Appl. No.: 10/175,493

(22) Filed: Jun. 20, 2002

(65) Prior Publication Data

US 2003/0039356 A1 Feb. 27, 2003

(30) Foreign Application Priority Data

Aug. 24, 2001 (JP) ............................ 2001-254421

(51) Int. Cl.
*H04L 9/00* (2006.01)
*H04L 1/00* (2006.01)

(52) U.S. Cl. ....................... 380/42; 713/190; 380/268; 380/270; 370/52

(58) Field of Classification Search .................. 380/42, 380/270, 52, 28, 268; 713/190
See application file for complete search history.

(56) References Cited

U.S. PATENT DOCUMENTS 4,278,837 A * 7/1981 Best .......................... 713/190
4,358,857 A * 11/1982 Gleason et al. ............... 380/31
4,431,865 A * 2/1984 Bernede et al. ............... 380/44
4,467,140 A * 8/1984 Fathauer et al. ............ 455/462
4,599,647 A * 7/1986 George et al. .............. 380/242
5,008,629 A * 4/1991 Ohba et al. ................. 327/107
5,019,813 A * 5/1991 Kip et al. ................ 340/10.51
5,189,543 A * 2/1993 Lin et al. .................... 398/106
5,432,849 A * 7/1995 Johnson et al. ............. 380/280
RE35,078 E * 10/1995 Ryan .......................... 380/218
5,751,811 A * 5/1998 Magnotti et al. ............. 380/28
5,774,065 A * 6/1998 Mabuchi et al. ....... 340/825.72
5,838,797 A * 11/1998 Iwasaki ...................... 380/270
5,963,104 A * 10/1999 Buer ........................... 331/78
5,995,539 A * 11/1999 Miller ........................ 375/222
6,038,321 A * 3/2000 Torigai et al. .............. 380/268
6,044,462 A * 3/2000 Zubeldia et al. ............ 713/158
6,088,800 A * 7/2000 Jones et al. ................. 713/189
6,105,006 A * 8/2000 Davis et al. .................. 705/35
6,128,386 A * 10/2000 Satterfield .................... 380/28
6,170,001 B1 * 1/2001 Hinds et al. ................ 708/495
6,195,752 B1 * 2/2001 Pfab .......................... 713/168
6,298,136 B1 * 10/2001 Den Boer .................... 380/29
6,367,012 B1 * 4/2002 Atkinson et al. ........... 713/176

(Continued)

FOREIGN PATENT DOCUMENTS

JP 9-18467 1/1997

(Continued)

*Primary Examiner*—Emmanuel L. Moise
*Assistant Examiner*—Techane J. Gergiso
(74) *Attorney, Agent, or Firm*—Staas & Halsey LLP

(57) ABSTRACT

An encryption method includes the steps of (a) generating random data including a first part and a second part, the first part specifying an operation to be performed on plain text data and the second part being used in the operation, (b) performing the specified operation on the plain text data using the second part of the random data, and (c) transmitting a result of the operation together with the random data.

12 Claims, 13 Drawing Sheets

U.S. PATENT DOCUMENTS 6,411,715 B1 * 6/2002 Liskov et al. ............... 380/277
6,438,252 B2 * 8/2002 Miller ........................ 382/100
6,442,525 B1 * 8/2002 Silverbrook et al. ........... 705/1
6,477,683 B1 * 11/2002 Killian et al. .................. 716/1
6,526,145 B2 * 2/2003 Marzahn ...................... 380/42
6,675,298 B1 * 1/2004 Folmsbee ................... 713/190
6,742,052 B2 * 5/2004 Himmel et al. ................ 710/2
6,807,553 B2 * 10/2004 Oerlemans .................. 708/252
6,889,325 B1 * 5/2005 Sipman et al. .............. 713/176
6,963,644 B1 * 11/2005 Matsuzaki et al. ............ 380/30
6,985,582 B1 * 1/2006 Sano et al. ................... 380/42
6,988,197 B1 * 1/2006 Persson et al. ............. 713/168
7,050,580 B1 * 5/2006 Ferre Herrero .............. 380/28
7,076,065 B2 * 7/2006 Sherman et al. ............ 380/263
7,171,693 B2 * 1/2007 Tucker et al. ................. 726/26
2001/0047480 A1 * 11/2001 Tanimoto et al. ........... 713/190
2002/0025036 A1 * 2/2002 Sato ............................ 380/42
2002/0159588 A1 * 10/2002 Kauffman et al. ............ 380/28

FOREIGN PATENT DOCUMENTS

JP 9-190264 7/1997

* cited by examiner

| | | F1 | |
|---|---|---|---|
| | | 0 | 1 |
| F0 | 0 | + | × |
| | 1 | − | ÷ |

ENCRYPTION METHOD, COMMUNICATION SYSTEM, TRANSMISSION DEVICE, AND DATA INPUT DEVICE

BACKGROUND OF THE INVENTION

1. Field of the Invention

The present invention relates to an encryption method, a communication system, a transmission device, and a data input device.

2. Description of the Related Art

More and more communication has become wireless between a computer and its peripheral devices such as a keyboard and a mouse. Such communication is conducted by infrared or at high radio frequencies. Unlike wire communication, however, information is subject to intercept in wireless communication. Therefore, the contents of communication are concealed.

Japanese Laid-Open Patent Application No. 9-190264, for instance, discloses a wireless data input system. According to this system, the contents of communication are concealed by encoding keyed-in data based on a security code.

According to this system, however, the data is single-encoded with a fixed ID, so that the data may be decoded with relative ease by processing the data rows.

SUMMARY OF THE INVENTION

Accordingly, it is a general object of the present invention to provide an encryption method in which the above-described disadvantage is eliminated.

A more specific object of the present invention is to provide an encryption method of high confidentiality, and a communication system, a transmission device, and a data input device that employ such an encryption method.

Another more specific object of the present invention is to provide a transmission device and a data input device using a phase-locked loop (PLL) in which the PLL becomes locked in a shorter period of time than conventionally and an error in the PLL can be recognized easily.

The above objects of the present invention are achieved by an encryption method including the steps of (a) generating random data including a first part and a second part, the first part specifying an operation to be performed on plain text data and the second part being used in the operation, (b) performing the specified operation on the plain text data using the second part of the random data, and (c) transmitting a result of the operation together with the random data.

The above-described encryption method realizes high confidentiality by generating the random data including the operation data and the operand data and encrypting the plain text data by using the random data.

The above-described objects of the present invention are also achieved by a communication system including a transmission device encrypting and transmitting original data and a reception device receiving and decrypting the encrypted data transmitted from the transmission device, wherein the transmission device includes: a random data generation part generating random data including operation data and operand data, the operation data specifying an operation to be performed on the original data and the operand data; an operation part performing the operation specified by the operation data on the original data and the operand data and generating the encrypted data as a result of the operation; and a transmission part transmitting the random data and the encrypted data; and the reception part includes: a reception part receiving the encrypted data and the random data; and a reverse operation part decrypting the encrypted data by performing thereon, based on the random data, a reverse operation of the operation performed by the operation part of the transmission device.

The above-described communication system realizes high confidentiality by forming the operation data specifying the operation to be performed and the operand data used in the operation into the random data. According to the above-described communication system, since the transmission device transmits the encrypted data and the random data used for encrypting the original data, the reception device can decrypt the encrypted data by performing thereon, based on the random data, the reverse operation of the operation performed on the original data by the transmission device.

The above objects of the present invention are also achieved by a transmission device having an oscillator employing a phase-locked loop (PLL), the transmission device including a control part digitizing a control voltage of a voltage-controlled oscillator in the PLL, and a transmission part transmitting the control voltage digitized by the control part.

According to the above-described transmission device, the control voltage of the voltage-controlled oscillator is digitized and transmitted by the transmission part, thereby allowing the receiver side to detect an abnormality in the transmission device.

The above objects of the present invention are further achieved by a data input device transmitting input data, the data input device including: a random data generation part generating random data including operation data and operand data, the operation data specifying an operation to be performed on the original input data and the operand data; an operation part performing the operation specified by the operation data on the original input data and the operand data and generating encrypted data as a result of the operation; and a transmission part transmitting the random data and the encrypted data.

According to the above-described data input device, the operation data specifying the operation to be performed and the operand data used in the operation together with the original data are formed into the random data, so that the above-described data input device realizes high confidentiality of communication.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
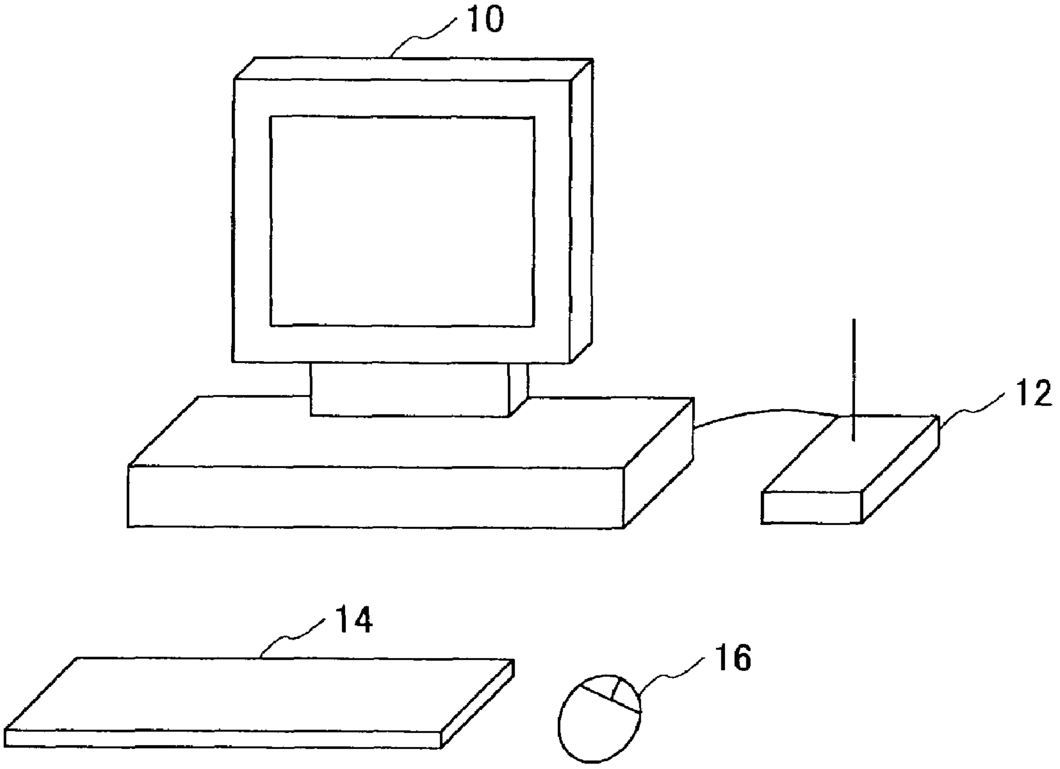
FIG. 1 is a diagram showing a configuration of the entire encrypted data transmission and reception system according to an embodiment of the present invention.

FIG. 1 is a diagram showing a configuration of the entire encrypted data transmission and reception system according to the embodiment of the present invention. The system includes a personal computer (PC) 10, a wireless communication device 12, a wireless keyboard 14, and a wireless mouse 16. The wireless keyboard 14 and the wireless mouse 16, which are input devices, transmit input signals. Neither the wireless keyboard 14 nor the wireless mouse 16 is cable-connected to the PC 10 in this system.

As will be described later, the wireless keyboard 14 and the wireless mouse 16 each have a radio communication part so as to communicate with the wireless communication device 12 by radio. Each of the wireless keyboard 14 and the wireless mouse 16 transmits input data or coordinate information to the wireless communication device 12. The wireless communication device 12 receives the data transmitted from the wireless keyboard 14 or the wireless mouse 16, and transmits the received data to the PC 10. The PC 10 receives the data and uses the received data in its processing.

Figure 2:
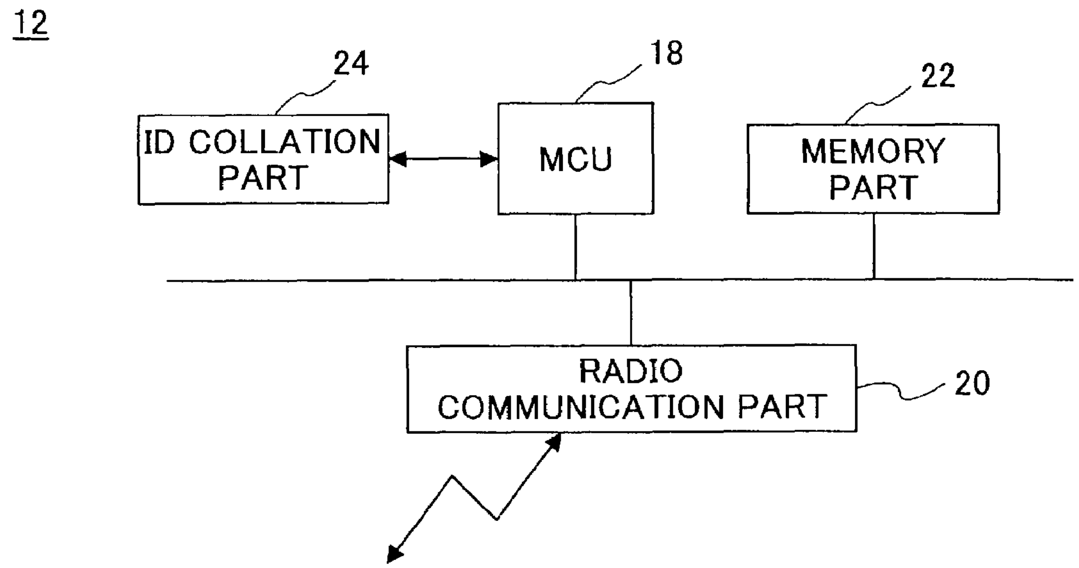
FIG. 2 is a block diagram showing a wireless communication device according to the embodiment of the present invention.

Next, FIG. 2 is a block diagram showing a wireless communication device 12. The wireless communication device 12 includes a micro controller unit (MCU) 18 controlling the wireless communication device 12, a radio communication part 20 performing radio communication such as reception of data transmitted by radio from the wireless keyboard 14 and the wireless mouse 16, a memory part 22 in which the MCU 18 stores data and programs, and an ID collation part 24 collating an ID transmitted from the wireless keyboard 14 or the wireless mouse 16 with a preset ID.

The wireless communication device 12 has the radio communication part 20 receive the encrypted data transmitted by radio from the wireless keyboard 14 or the wireless mouse 16, and transmits the decrypted data to the PC 10 if the ID included in the received data is identical to the ID prestored in the wireless communication device 12.

Figure 3:
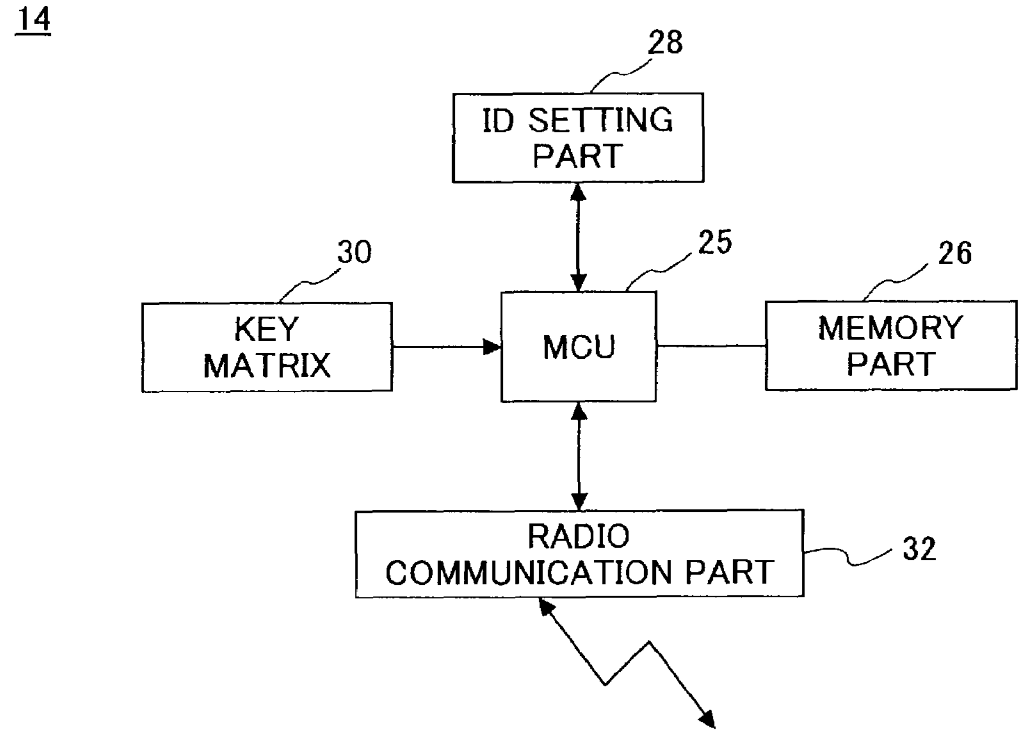
FIG. 3 is a block diagram showing a wireless keyboard according to the embodiment of the present invention.

Next, FIG. 3 is a block diagram showing the wireless keyboard 14. The wireless keyboard 14 includes an MCU 25 controlling the entire wireless keyboard 14, a radio communication part 32 communicating by radio with the wireless communication device 12, a memory part 26 in which the MCU 25 stores data and programs, an ID setting part 28 setting an ID for identifying the wireless keyboard 14, and a key matrix 30 for obtaining key information.

The wireless keyboard 14 obtains keyed-in data from the key matrix 30 and encrypts the keyed-in data in the MCU 25. The ID set by the ID setting part 28 is added to the encrypted data, and the encrypted data with the ID is transmitted from the radio communication part 32.

Figure 4:
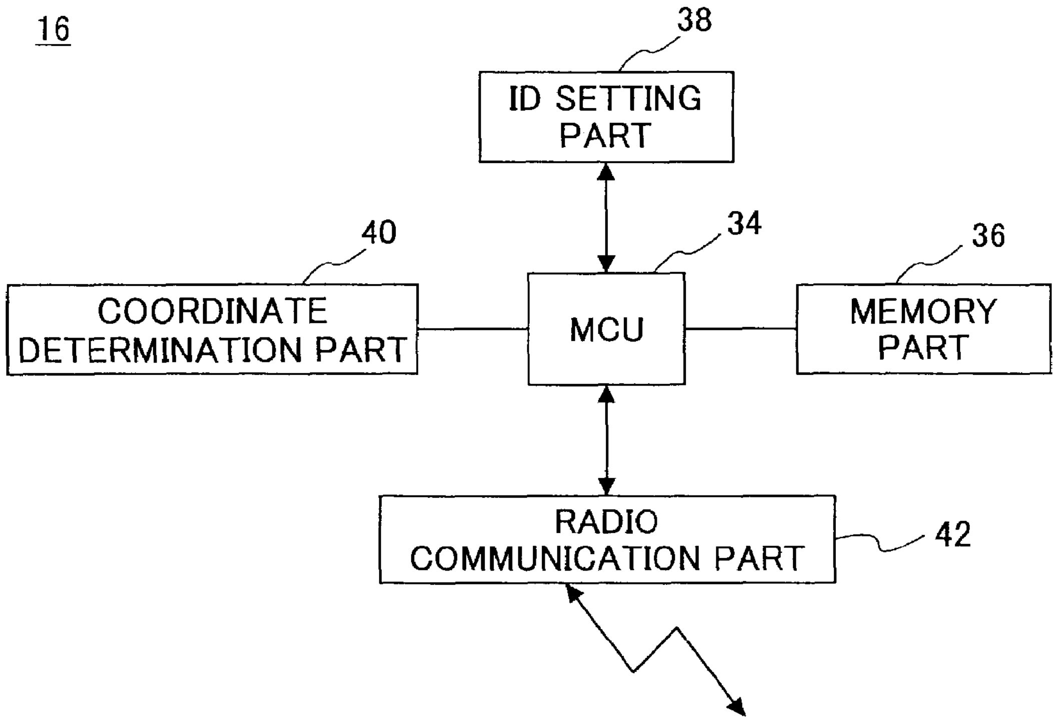
FIG. 4 is a diagram showing a wireless mouse according to the embodiment of the present invention.

Next, FIG. 4 is a diagram showing the wireless mouse 16. The wireless mouse 16 includes an MCU 34 controlling the entire wireless mouse 16, a radio communication part 42 communicating by radio with the wireless communication device 12, a memory part 36 in which the MCU 34 stores data and programs, an ID setting part 38 setting an ID for identifying the wireless mouse 16, and a coordinate determination part 40 determining the positions of coordinates.

The wireless mouse 16 obtains input coordinate data from the coordinate determination part 40 and encrypts the coordinate data in the MCU 34. The ID set by the ID setting part 38 is added to the encrypted data, and the encrypted data with the ID is transmitted from the radio communication part 42.

As described above, each of the wireless keyboard 14 and the wireless mouse 16 secures the confidentiality of the contents of communication with the wireless communication device 12 by encrypting the contents of communication. Communication between the wireless communication device 12 and the wireless keyboard 14 or the wireless mouse 16 employs weak radio waves so that the contents of communication may be less subject to interception, thereby increasing the confidentiality of communication.

The encryption method is as follows. The transmitter of data generates random data in which an operation to be performed is specified by given bits, which are data specifying the type or method of operation (hereinafter, operation data). The part of the random data other than the operation data specifying the operation to be performed is data (hereinafter, operand data) used in the operation to be performed. The specified operation is performed on (plain text) data to be transmitted and the operand data, and then the encrypted data, which is the result of the operation, is transmitted together with the random data.

Receiving the encrypted data and the random data, the receiver decrypts the encrypted data by performing a reverse operation on the encrypted data and the operand data, the operand data being included in the received random data.

The random data also includes the operation data. Accordingly, the random data includes both the operand data and the operation data. A detailed description will be given below, with reference to the wireless keyboard 14, of the encryption method.

First, a description will be given, with reference to FIG. 5, of random data 44. The random data 44, which is a random value generated by, for instance, a random value generation circuit (not shown in the drawing) housed in the MCU 25, is composed of operand data 46 and two-bit operation data 48 as previously described.

The operand data 46 is provided for performing an operation corresponding to the operation data 48 on data to be encrypted, such as the keyed-in data.

The operation data 48 is composed of two bits; a bit F0 and a bit F1. Each of the bits F0 and F1 of the operation data 48 is determined by a table of operations shown in FIG. 6.

Figures 6, 7:
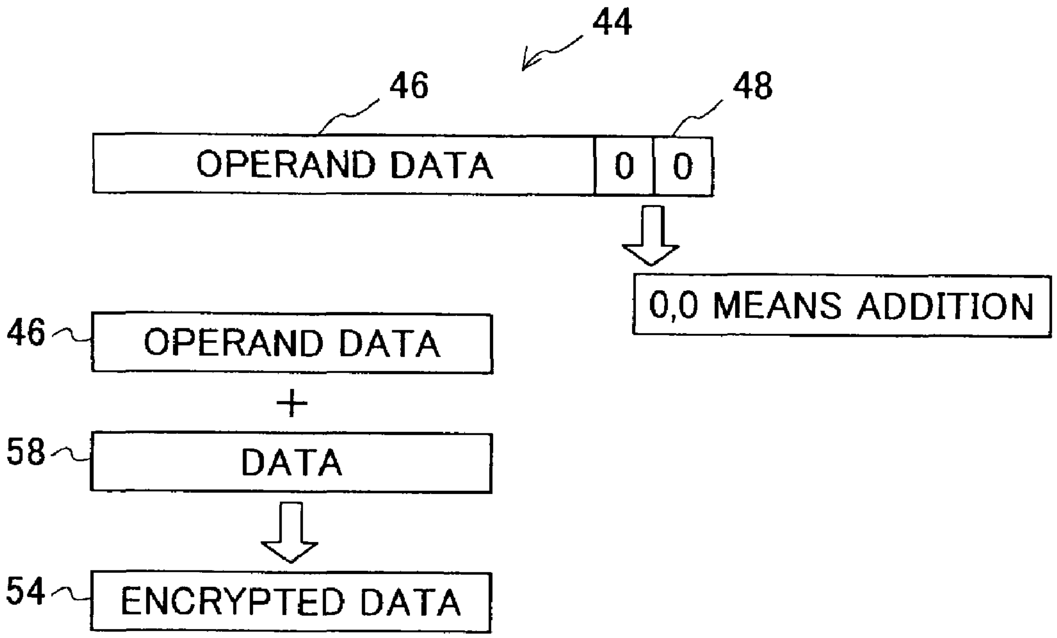
FIG. 6 is a diagram showing a table of operations according to the embodiment of the present invention.
FIG. 7 is a diagram showing a method of generating encrypted data by using the random data of FIG. 5 according to the embodiment of the present invention.

In FIG. 6, "0" and "1" down indicate the values of the bit F0 and "0" and "1" across indicate the values of the bit F1.

As shown in FIG. 6, when both bits F0 and F1 are "0"s, the operation to be performed specified by the operation data 48 is addition. When both bits F0 and F1 are "1"s, the operation specified by the operation data 48 is division. When the bit F0 is "0" and the bit F1 is "1", the operation specified by the operation data 48 is multiplication. When the bit F0 is "1" and the bit F1 is "0", the operation specified by the operation data 48 is subtraction.

Next, FIG. 7 is a diagram showing a method of generating encrypted data by using the random data 44. In FIG. 7, since both bits F0 and F1 representing the operation data 48 of the random data 44 are "0"s, the operation specified by the operation data 48 is addition according to the table of operations shown in FIG. 6.

In FIG. 7, data 58 is data to be encrypted, such as the keyed-in data. Then, by adding up the operand data 46 and the data 58, encrypted data 54 is generated.

The thus generated encrypted data 54 is transmitted, together with the random data 44 and an ID 56 of the wireless keyboard 14, from the wireless keyboard 14 to the wireless communication device 12.

Figure 8:
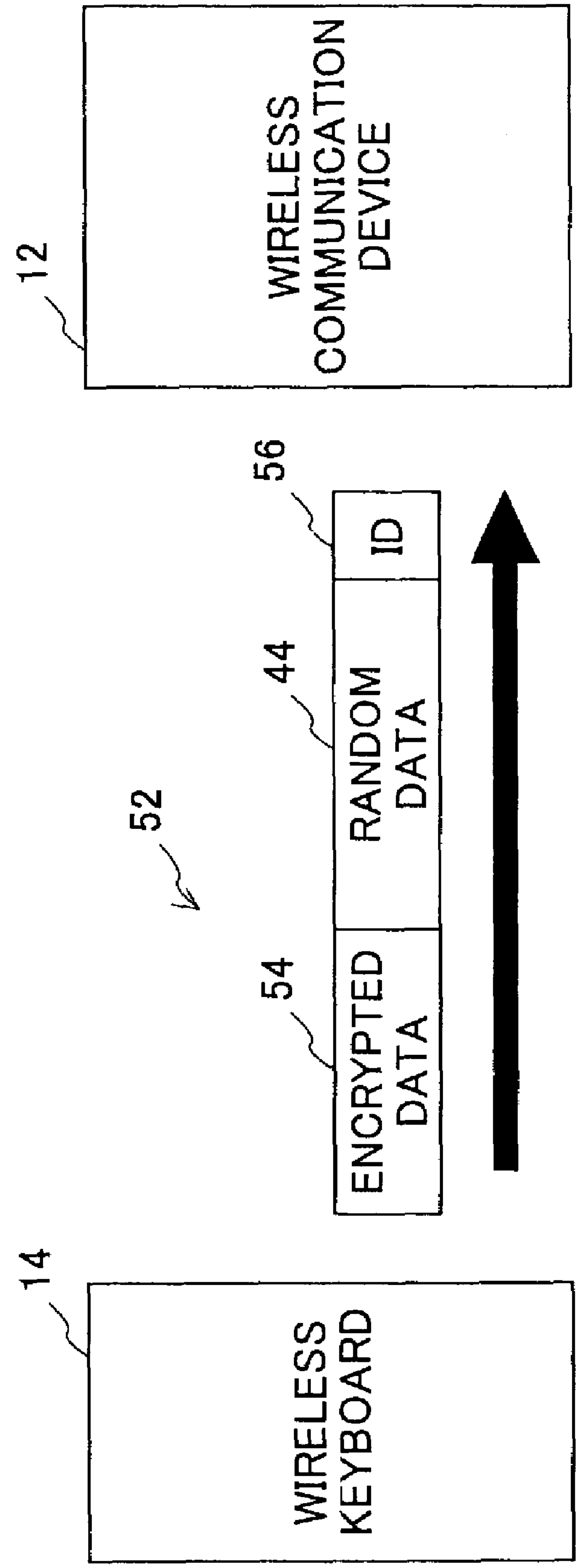
FIG. 8 is a diagram showing data transmitted from the wireless keyboard of FIG. 3 to the wireless communication device of FIG. 2 according to the embodiment of the present invention.

FIG. 8 is a diagram showing data 52 transmitted from the wireless keyboard 14 (transmitter) to the wireless communication device 12 (receiver). The transmitted data 52 is composed of the encrypted data 54, the random data 44, and the ID 56.

Figure 9:
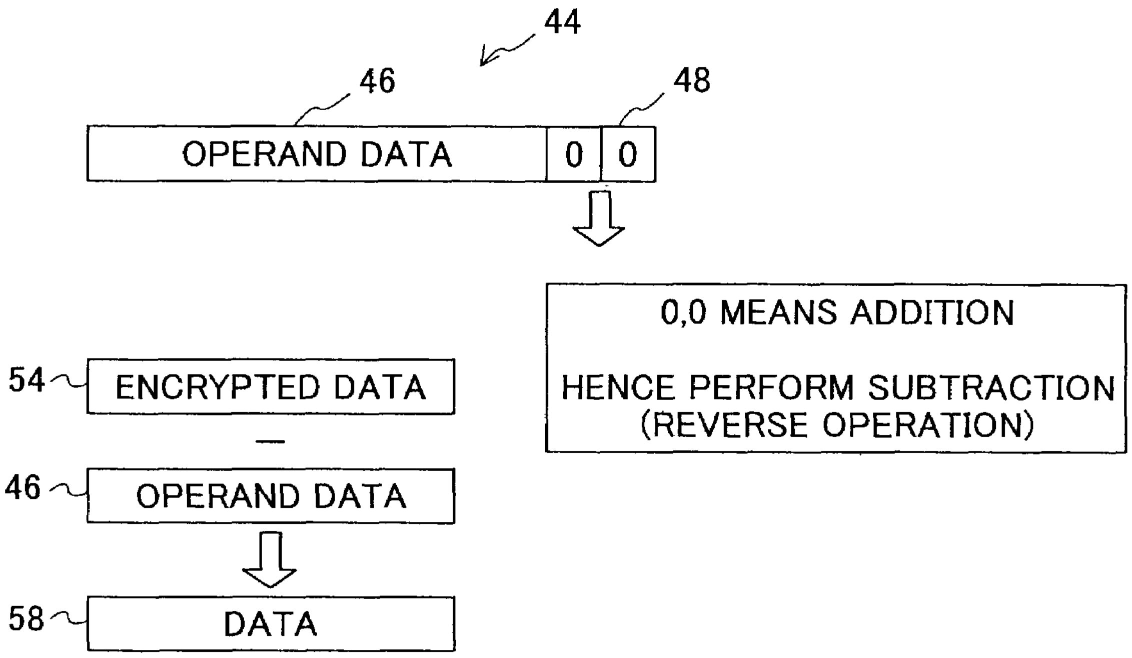
FIG. 9 is a diagram showing a method of decrypting the encrypted data in the wireless communication device of FIG. 2 according to the embodiment of the present invention.

FIG. 9 is a diagram showing a method of decrypting the encrypted data 54 in the wireless communication device 12, which is the receiver of the transmitted data 52.

First, the operation data 48 of the random data 44 is referred to. Since both bits F0 and F1 are "0"s, the operation specified by the operation data 48 is addition.

Therefore, by performing subtraction, which is the reverse operation of addition, on the encrypted data 54 and the operand data 46, the encrypted data 54 can be decrypted to the data 58.

Figure 10:
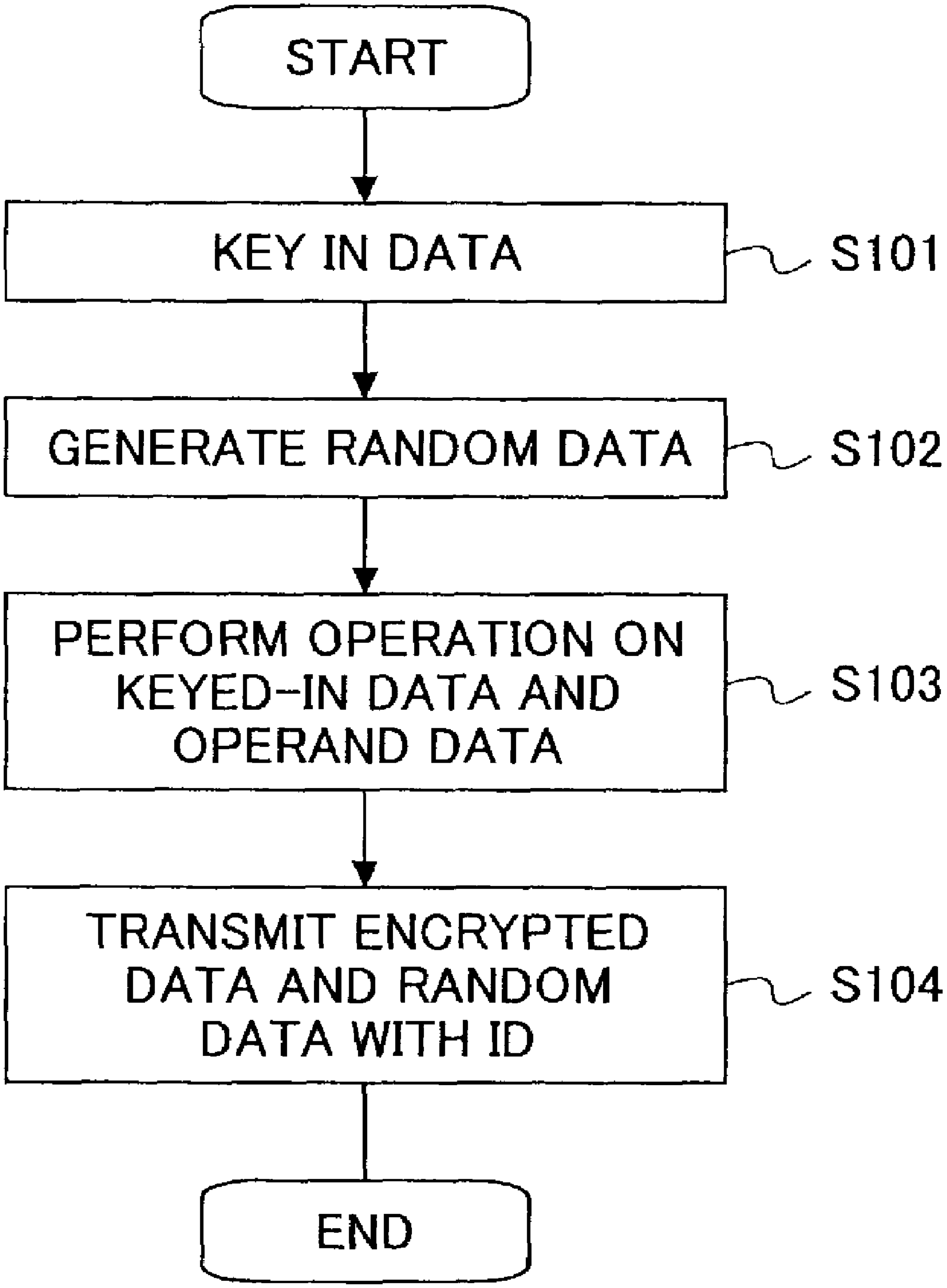
FIG. 10 is a flowchart of encryption and transmission of keyed-in data performed by the wireless keyboard of FIG. 3 according to the embodiment of the present invention.
Figure 11:
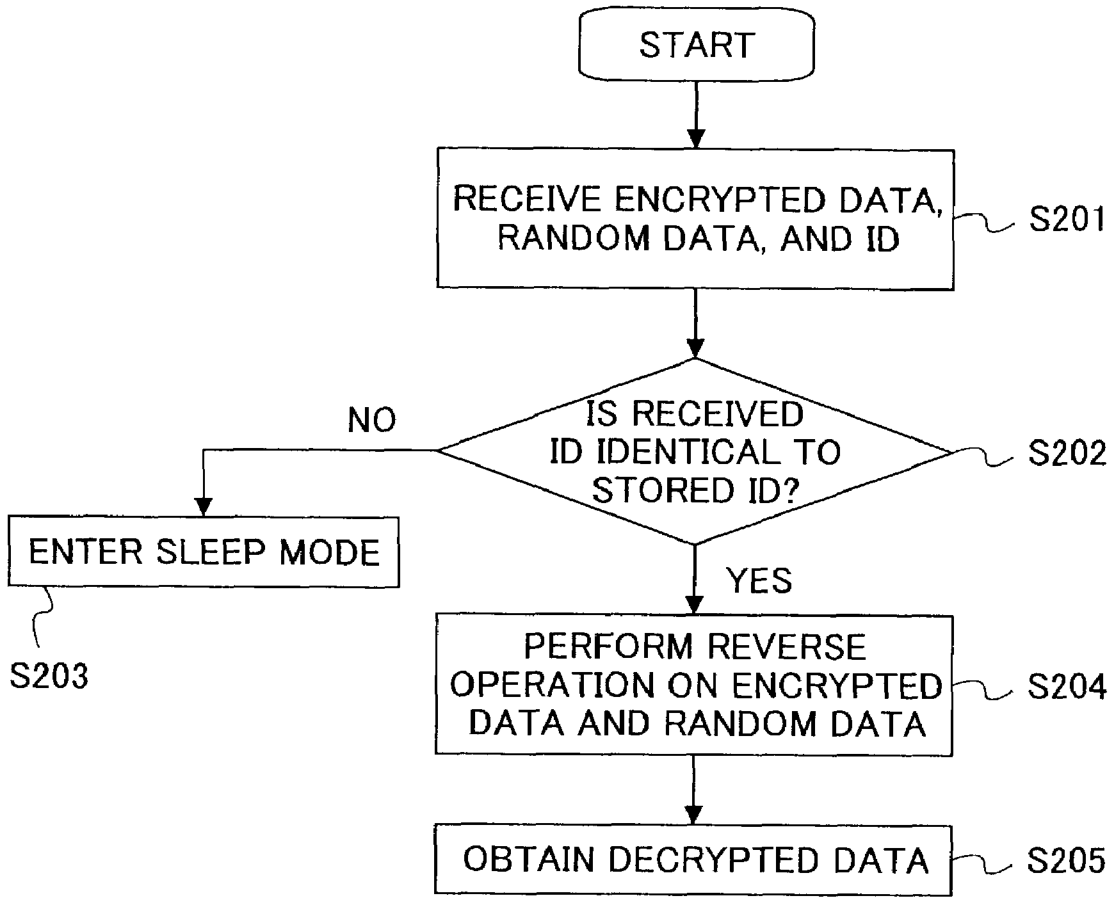
FIG. 11 is a flowchart of data reception and decryption by the wireless communication device of FIG. 2 according to the embodiment of the present invention.

FIGS. 10 and 11 are flowcharts of the above-described encryption method and decryption method, respectively. FIG. 10 shows encryption and transmission of the keyed-in data 58 performed by the wireless keyboard 14.

First, in step S101, the data 58 is keyed in. Then, in step S102, the random data 44 shown in FIG. 5 is generated. In step S102, the operand data 46 forming the random data 44 is generated by, for instance, a random value generator. Further, the operation data 48 forming the random value 44 is selected at random based on the table of operations shown in FIG. 6.

In step S103, the operation specified by the operation data 48 is performed on the keyed-in data 58 and the operand data 46, so that the encrypted data 54 is generated.

Next, in step S104, the random data 44 and the encrypted data 54 are transmitted with the ID 56, which is identification information, being added thereto. The wireless keyboard 14 performs the above-described operation to encrypt and transmit the keyed-in data. Likewise, the wireless mouse 16 encrypts and transmits data. If the operation to be performed is predetermined between the transmitter and the receiver in this encryption method, the bits F0 and F1 specifying the operation to be performed are omittable.

Next, a description will be given, with reference to the flowchart of FIG. 11, of reception and decryption of the encrypted data 54, the random data 44, and the ID 56 performed by the wireless communication device 12.

First, in step S201, the data 52 composed of the encrypted data 54, the random data 44, and the ID is received. Next, in step S202, collation of the ID 56 is performed for device identification. If the received ID 56 is not identical to the ID of the wireless keyboard 14 prestored in the wireless communication device 12, in step S203, sleep mode is entered so that the operation is stopped.

If the ID 56 is identical to the ID of the wireless keyboard 14, in step S204, the reverse operation of the operation specified by the operation data 48 included in the random data 44 is performed on the encrypted data 54 and the operand data 46 included in the random data 44, so that the encrypted data 54 is decrypted. As a result, in step S205, the decrypted data (original keyed-in data 58) is obtained.

Next, a description will be given of the ID 56 added to and transmitted with the encrypted data 54 and the random data 44. In the case of radio communication as in this embodiment, if computers are provided next to each other, input data such as keyed-in data transmitted from a keyboard or a mouse belonging to a given one of the computers may wrongly be input to another one of the computers.

In the case of radio communication, in order to avoid such an input error, not only data to be transmitted is encrypted to increase the security of communication, but also, normally, an ID for identifying the device transmitting the encrypted data is transmitted in addition to the encrypted data.

Next, a description will be given of ID setting operations of the ID setting parts 28 and 38.

Conventionally, an ID is stored in a ROM in most cases. However, the ID 56 may be set by using general-purpose ports of the MCU 25 included in the wireless keyboard 14 or the MCU 34 included in the wireless mouse 16 without using a special ROM.

Figure 12:
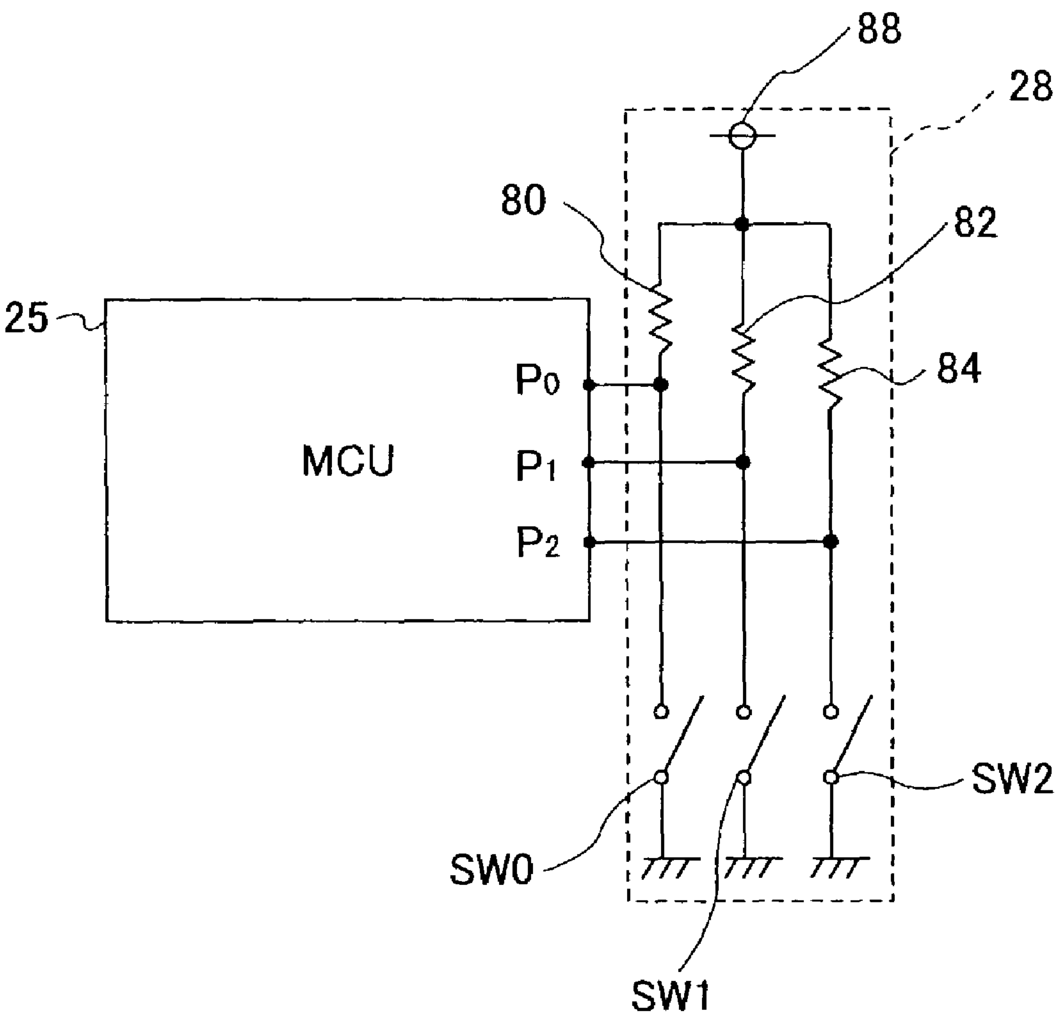
FIG. 12 is a diagram showing a configuration of an ID setting part of the wireless keyboard of FIG. 3 according to the embodiment of the present invention.

FIG. 12 is a diagram showing a configuration of the ID setting part 28 of the wireless keyboard 14. Here, a description will be given of the ID setting part 28 of the wireless keyboard 14.

The ID setting part 28 includes resistors 80, 82, and 84 and switches SW0, SW1, and SW2. The resistors 80, 82, and 84 are connected in series to the switches SW0, SW1, and SW2, respectively. Each of a series circuit formed of the resistor 80 and the switch SW0, a series circuit formed of the resistor 82 and the switch SW1, and a series circuit formed of the resistor 84 and the switch SW2 is connected between a power supply 88 and ground.

A connecting point of the resistor 80 and the switch SW0 is connected to a general-purpose port P0 of the MCU 25, a connecting point of the resistor 82 and the switch SW1 is connected to a general-purpose port P1 of the MCU 25, and a connecting point of the resistor 84 and the switch SW2 is connected to a general-purpose port P2 of the MCU 25.

The MCU 25 recognizes a logical value "0" or "1" from the level of each of the general-purpose ports P0 through P2, and recognizes a three-bit array of the logical values of the general-purpose ports P0 through P2 as the ID 56.

When all of the switches SW0 through SW2 are switched OFF, for instance, an electric current is supplied from the power supply 88 to the general-purpose ports P0 through P2 via the resistors 80, 82, and 84, respectively. Accordingly, the electric current is supplied to the general-purpose ports P0 through P2, so that all of the general-purpose ports P0 through P2 have their levels set to HIGH. Therefore, the MCU 25 recognizes each of the general-purpose ports P0 through P2 as the logical value "1", thus setting the ID 56 to "111".

When the switch SW0 is switched ON while the switches SW1 and SW2 are switched OFF, the general-purpose port P0 is grounded to have its level set to LOW. Therefore, the MCU 25 recognizes the general-purpose port P0 as the logical value "0". At this point, the switches SW1 and SW2 are switched OFF, so that the general-purpose ports P1 and P2 have their levels set to HIGH. Therefore, the MCU 25 recognizes each of the general-purpose ports P1 and P2 as the logical value "1". Accordingly, the MCU 25 sets the ID 56 to "011".

When the switches SW0 and SW1 are switched ON while the switch SW2 is switched OFF, both general-purpose ports P0 and P1 are grounded to have their levels set to LOW. Therefore, the MCU 25 recognizes each of the general-purpose ports P0 and P1 as the logical value "0". At this point, the switch SW2 is switched OFF, so that the general-purpose port P2 have its level set to HIGH. Therefore, the MCU 25 recognizes the general-purpose port P2 as the logical value "1". Accordingly, the MCU 25 sets the ID 56 to "001".

When the switches SW0 and SW2 are switched ON while the switch SW1 is switched OFF, both general-purpose ports P0 and P2 are grounded to have their levels set to LOW. Therefore, the MCU 25 recognizes each of the general-purpose ports P0 and P2 as the logical value "0". At this point, the switch SW1 is switched OFF, so that the general-purpose port P1 have its level set to HIGH. Therefore, the MCU 25 recognizes the general-purpose port P1 as the logical value "1". Accordingly, the MCU 25 sets the ID 56 to "010".

When the switch SW1 is switched ON while the switches SW0 and SW2 are switched OFF, the general-purpose port P1 is grounded to have its level set to LOW. Therefore, the MCU 25 recognizes the general-purpose port P1 as the logical value "0". At this point, the switches SW0 and SW2 are switched OFF, so that the general-purpose ports P0 and P2 have their levels set to HIGH. Therefore, the MCU 25 recognizes each of the general-purpose ports P0 and P2 as the logical value "1". Accordingly, the MCU 25 sets the ID 56 to "101".

When the switch SW2 is switched ON while the switches SW0 and SW1 are switched OFF, the general-purpose port P2 is grounded to have its level set to LOW. Therefore, the MCU 25 recognizes the general-purpose port P2 as the logical value "0". At this point, the switches SW0 and SW1 are switched OFF, so that the general-purpose ports P0 and P1 have their levels set to HIGH. Therefore, the MCU 25 recognizes each of the general-purpose ports P0 and P1 as the logical value "1". Accordingly, the MCU 25 sets the ID 56 to "110".

When the switches SW1 and SW2 are switched ON while the switch SW0 is switched OFF, both general-purpose ports P1 and P2 are grounded to have their levels set to LOW. Therefore, the MCU 25 recognizes each of the general-purpose ports P1 and P2 as the logical value "0". At this point, the switch SW0 is switched OFF, so that the general-purpose port P0 has its level set to HIGH. Therefore, the MCU 25 recognizes the general-purpose port P0 as the logical value "1". Accordingly, the MCU 25 sets the ID 56 to "100".

When all of the switches SW0 through SW2 are switched ON, all of the general-purpose ports P0 through P2 of the MCU 25 have their levels set to LOW. Therefore, the MCU 25 recognizes each of the general-purpose ports P0 through P2 as the logical value "0", thus setting the ID 56 to "000".

Thus, the ID 56 can be set to the eight different values by the three general-purpose ports P0 through P2.

Therefore, the ID 56 can be set easily without using a special ROM. Further, the ID 56 can also be set by using, for instance, the wiring pattern of a circuit board instead of the switches SW0 through SW2.

In such a case, the switches SW0 through SW2 of FIG. 12 are formed of a wiring pattern. At this point, the ID 56 can be set to eight different values as the resistors 80, 82, and 84 are grounded or ungrounded according to eight corresponding wiring patterns. That is, by preparing the eight different wiring patterns beforehand, the ID 56 is automatically set to any desired one of the eight different values by mounting the MCU 25 and the resistors 80, 82, and 84 on the circuit of the desired wiring pattern. Therefore, no operation for providing a special setting, such as switching ON or OFF the switches SW0 through SW2, is required.

The above-described configuration applied to the wireless keyboard 14 is also applicable to the wireless mouse 16.

Further, the random data 44, which is generated by the operation of the MCU 25 or 34 in this embodiment, may also be generated by using the voltage of the internal circuit of the wireless keyboard 14 or the wireless mouse 16.

Next, a description will be given of a method of generating the random data 44 used in the above-described encryption method by using the voltage of the internal circuit of the wireless keyboard 14 or the wireless mouse 16.

Figure 13:
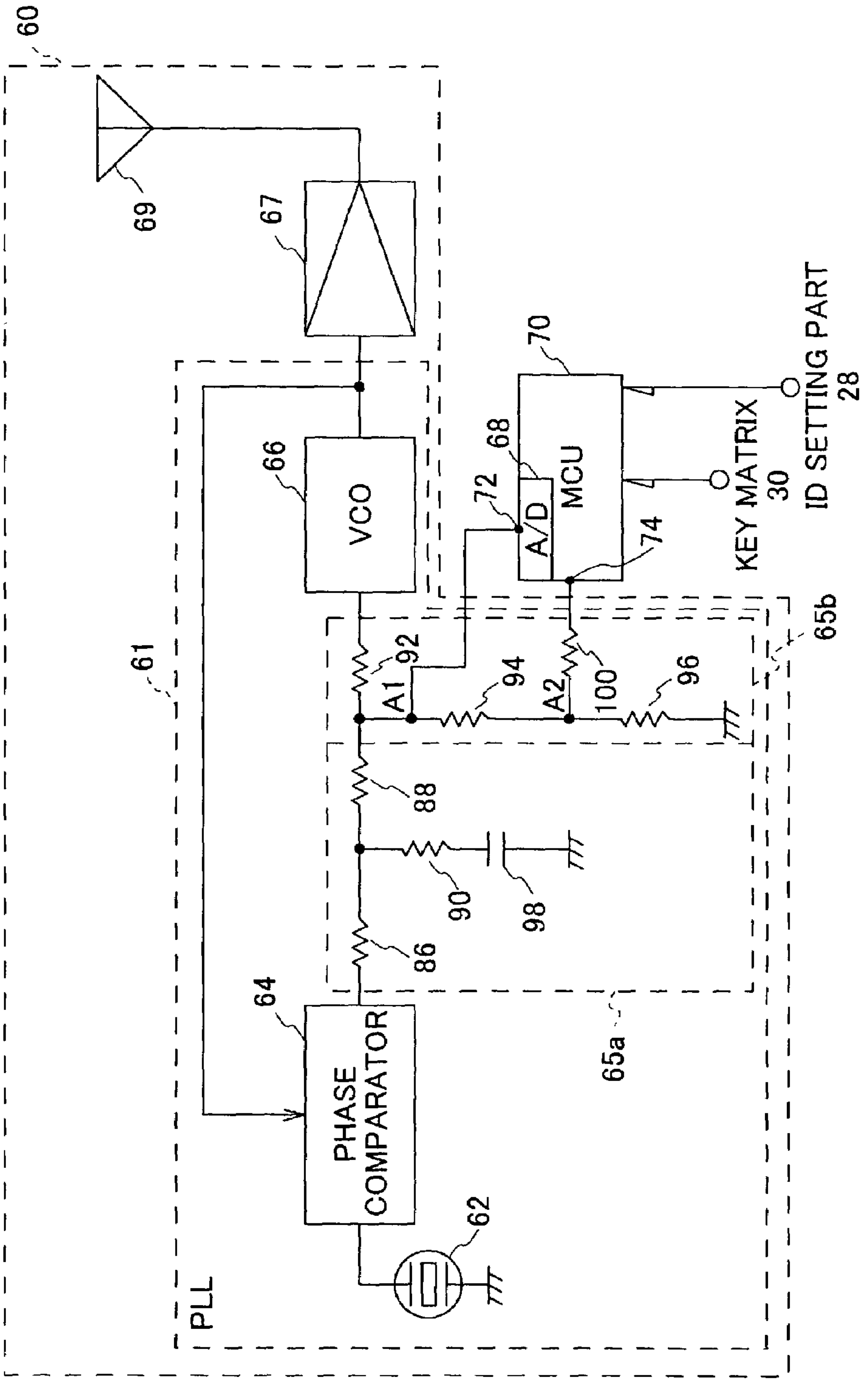
FIG. 13 is a block diagram showing an important part of a variation of the wireless keyboard of FIG. 3 according to the embodiment of the present invention.

FIG. 13 is a block diagram showing an important part of a variation of the wireless keyboard 14.

The variation of the wireless keyboard 14 has an MCU 70 and a radio communication part 60 different in configuration from the MCU 25 and the radio communication part 32 of the wireless keyboard 14 of FIG. 3.

The radio communication part 60 of the variation includes a PLL circuit 61, an amplifier 67, and an antenna 69.

The PLL circuit 61, which is connected to general-purpose ports 72 and 74 of the MCU 70, frequency-modulates a reference frequency by data to be transmitted and supplies the modulated signal to the amplifier 67. The amplifier 67 amplifies the output modulated signal of the PLL circuit 61. The frequency-modulated signal amplified by the amplifier 67 is radiated outward from the antenna 69.

A detailed description will now be given of the PLL circuit 61.

The PLL circuit 61 includes a reference oscillator 62, a phase comparator 64, a low-pass filter 65*a*, a superposition circuit 65*b*, and a voltage-controlled oscillator (VCO) 66.

The reference oscillator 62 includes a crystal oscillator and outputs the reference frequency corresponding to the carrier frequency.

The signal of the reference frequency output from the reference oscillator 62 is supplied to the phase comparator 64, to which the output signal of the VCO 66 is supplied. The phase comparator 64 compares the reference frequency supplied from the reference oscillator 62 and the frequency of the output signal of the VCO 66, and outputs a voltage corresponding to the phase difference. The output voltage of the phase comparator 64 is pulled up to a given bias voltage. The phase comparator 64 outputs a voltage lower than the bias voltage when the frequency of the output signal of the VCO 66 is higher than the reference frequency of the reference oscillator 62, and outputs a voltage higher than the bias voltage when the frequency of the output signal of the VCO 66 is lower than the reference frequency of the reference oscillator 62.

The output voltage of the phase comparator 64 is supplied to the low-pass filter 65*a*. The low-pass filter 65*a* includes resistors 86, 88, and 90 and a capacitor 98, and passes the lower-frequency components of the output signal of the phase comparator 64.

The output of the low-pass filter 65*a* is supplied to the superposition circuit 65*b*.

The superposition circuit 65*b* includes resistors 92, 94, 96, and 100. The superposition circuit 65*b,* which is connected to general-purpose ports 72 and 74 of the MCU 70, combines the output voltages of the low-pass filter 65*a* and the general-purpose ports 72 and 74 of the MCU 70 and supplies the resultant composite voltage to the VCO 66.

The VCO 66 oscillates at a frequency corresponding to the control voltage supplied from the superposition circuit 65*b*.

Figure 14:
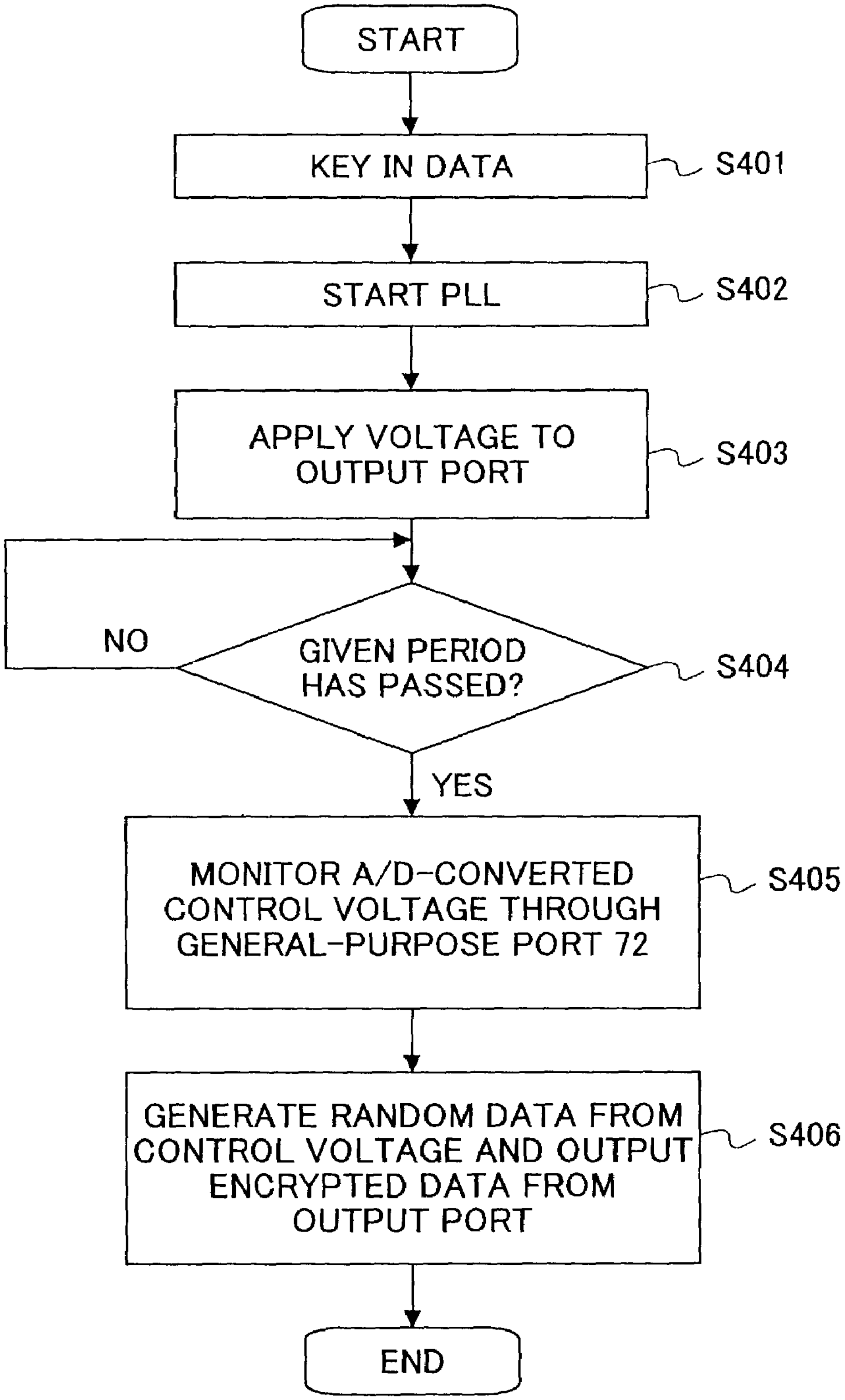
FIG. 14 is a flowchart of a key-in operation according to the embodiment of the present invention.
Figure 15:
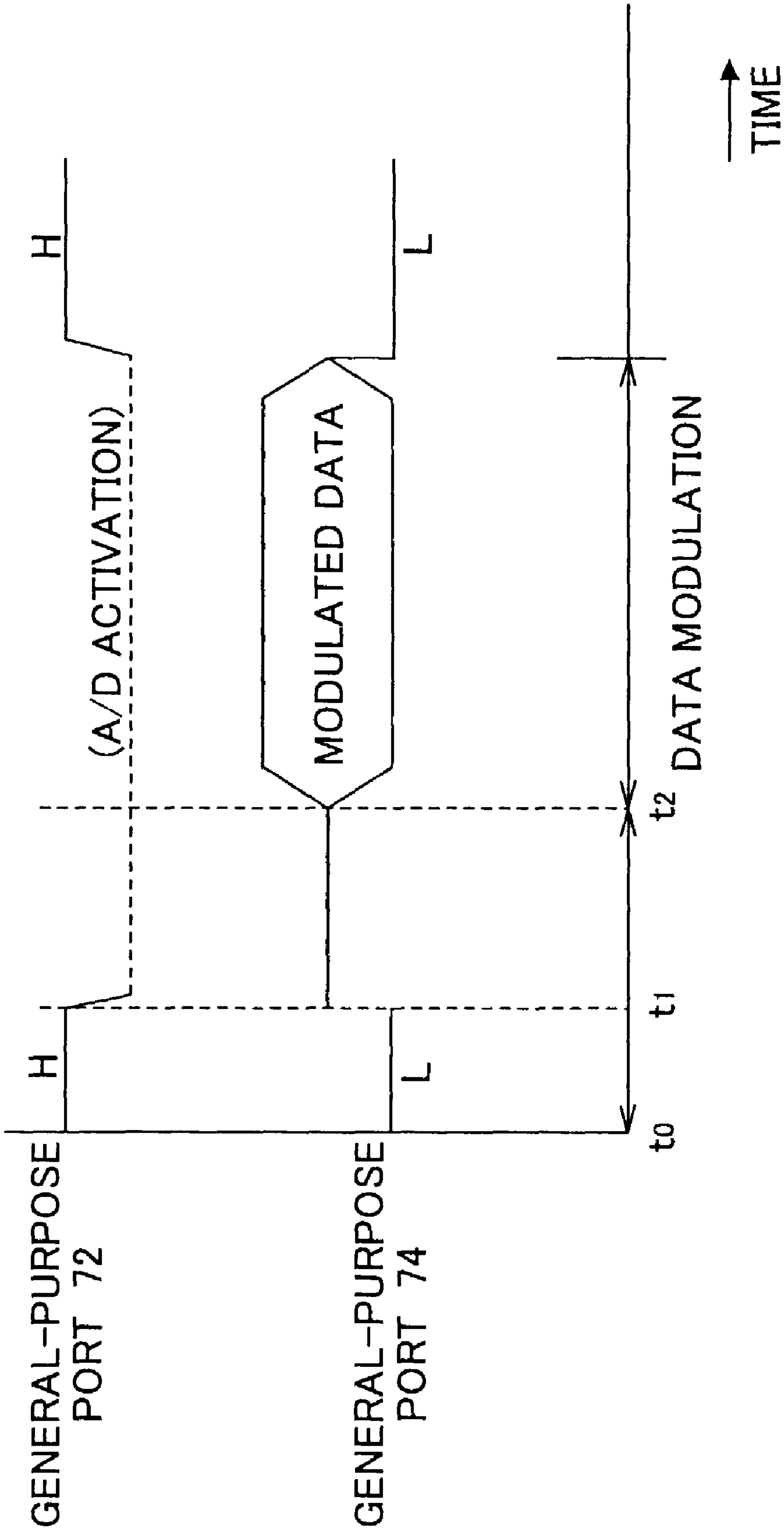
FIG. 15 is a timing chart for illustrating the key-in operation of FIG. 14.

Next, a description will be given of a key-in operation. FIG. 14 is a flowchart of the key-in operation, and FIG. 15 is a timing chart for illustrating the key-in operation.

The following description will be given with reference to the wireless keyboard 14.

First, in step S401, data is keyed in. Next, in step S402, the radio communication part 60 is activated by the key-in of the data. At this point, the MCU 70 starts a built-in timer. The built-in timer counts time required for completion of the lockup of the PLL circuit 61 after the activation of the radio communication part 60.

Then, in step S403, the MCU 70 has the level of its general-purpose port 72 set to HIGH. Step S403 corresponds to a time t0 shown in FIG. 15.

The level of the general-purpose port 72 is set to HIGH in step S403 so that the control voltage supplied to the VCO 66 rises to the bias voltage. By setting the level of the general-purpose port 72 to HIGH, the PLL circuit 61 can enter a lockup state in a shorter period of time.

Figure 16:
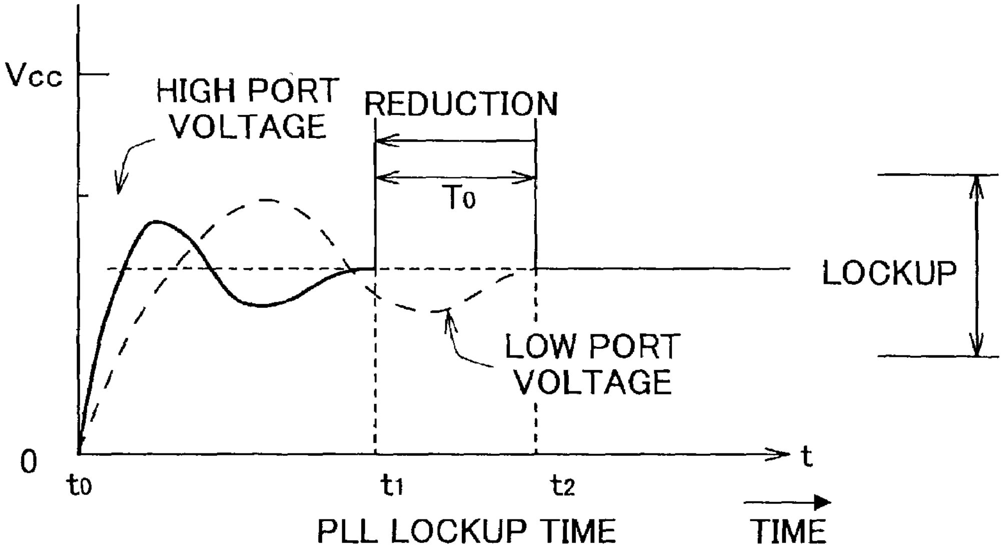
FIG. 16 is a graph for illustrating a startup operation of a PLL circuit of the variation of the wireless keyboard of FIG. 3 according to the embodiment of the present invention.

FIG. 16 is a graph for illustrating the startup operation of the PLL circuit 61. In FIG. 16, the horizontal axis represents time and the vertical axis represents voltage. Further, the solid line and the broken line indicate changes in voltage when the voltage level of the general-purpose port 72 is set to HIGH and LOW, respectively, at the startup time.

By setting the voltage level of the general-purpose port 72 to HIGH with the startup of the PLL circuit 61, the control voltage supplied to the VCO 66 can rise sharply to the bias level. Thereby, the output frequency of the VCO 66 quickly matches the reference frequency generated by the reference oscillator 64, so that time required to achieve the lockup of the PLL circuit 61 can be reduced. For instance, the PLL circuit 61 can be locked at a time $t_1$, which is shorter by a period $T_0$ than a time $t_2$ at which the PLL circuit 61 becomes locked, as indicated by the broken line in FIG. 16, when the voltage level of the general-purpose port 72 is set to LOW.

In step S404 of FIG. 14, it is determined whether a given period of time that the PLL circuit 61 is supposed to take before completing the lockup after the startup has passed. If it is determined in step S404 that the given period of time has passed, it is determined that the PLL circuit 61 is locked. Therefore, in step S405, the MCU 70 causes the general-purpose port 72 to operate as an input port, and causes an analog-to-digital (A/D) converter 68 to monitor the voltage of a connecting point A1 of the resistors 88 and 92. This timing corresponds to the time $t_1$ of FIG. 15.

Figure 5:
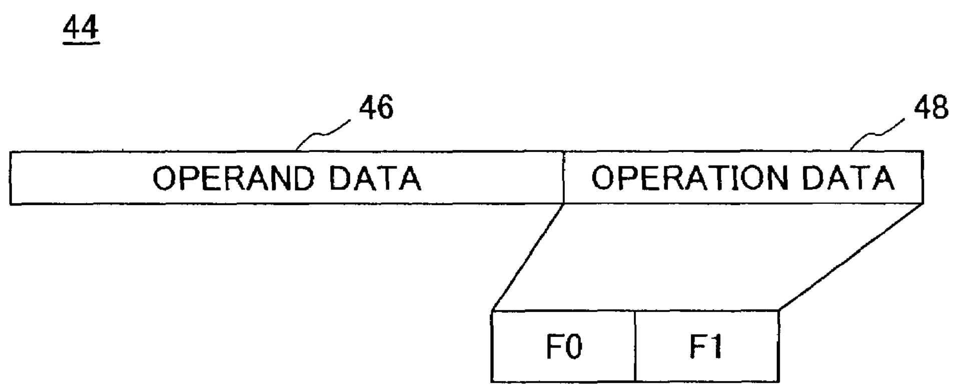
FIG. 5 is a diagram showing random data according to the embodiment of the present invention.

Next, in step S406, the random data 44 of FIG. 5 is generated from the detected voltage converted into digital data. The encrypted data 54 is generated based on the random data 44 generated by the A/D conversion and the keyed-in data 58 from the key matrix 30, and is output from the general-purpose port 74 together with the ID 56 set by the ID setting part 28. This timing corresponds to the time $t_2$ of FIG. 15.

The frequency of the VCO 66 of the PLL circuit 61 varies in accordance with ambient temperature. Therefore, the control voltage is never constant, and is ever-changing in accordance with the surrounding environment such as ambient temperature. Accordingly, the digital data into which the control voltage of the VCO 66 is converted can be employed as the random data 44.

The general-purpose port 74 has its level set to LOW when a bit forming the encrypted data 54 is "0", and to HIGH when a bit forming the encrypted data 54 is "1". When the general-purpose port 74 has its level set to LOW, the control voltage of the VCO 66 is lowered, so that the output frequency of the VCO 66 becomes lower. When the general-purpose port 74 has its level set to HIGH, the control voltage of the VCO 66 is raised, so that the output frequency of the VCO 66 becomes higher. At this point, the output frequency of the VCO 66 is controlled to be constant by the loop of the PLL circuit 61. Since the frequency of the encrypted data 54 is set to be sufficiently higher than the response frequency of the PLL circuit 61, the output of the VCO 66 is a signal frequency-modulated in accordance with the encrypted data 54.

In this embodiment, the random data 44 is generated from the control voltage of the PLL circuit 61, while it is also possible to use the voltage of a desired connecting point in the circuit forming the wireless keyboard 14 in order to generate the random data 44. That is, the voltage of any connecting point may be used as far as the voltage varies in accordance with the surrounding environment.

In the above-described variation of the wireless keyboard 14, the control voltage of the VCO 66 is monitored. Therefore, an abnormality in the PLL circuit 61 can be detected by determining the lockup state of the PLL circuit 61 from the results of monitoring the control voltage.

Figure 17:
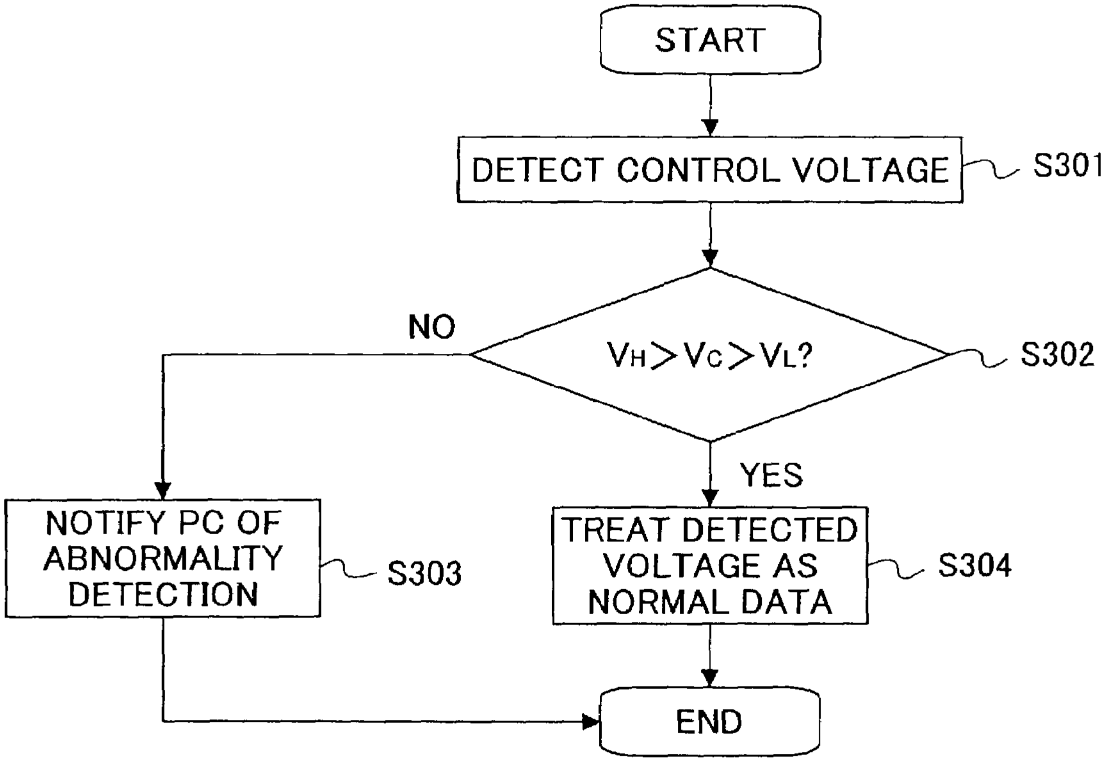
FIG. 17 is a flowchart of detection of an abnormality in a control voltage by an MCU of the variation of the wireless keyboard of FIG. 3 according to the embodiment of the present invention.

FIG. 17 is a flowchart of detection of an abnormality in the control voltage by the MCU 70.

First, in step S301, the MCU 70 detects a control voltage value $V_C$ at a connecting point $A_1$ from the general-purpose port 72. Next, in step S302, it is determined whether the control voltage value $V_C$ falls within a predetermined normal range of an upper limit value $V_H$ to a lower limit value $V_L$.

If it is determined as a result of step S302 that the control voltage value $V_C$ falls within the normal range, in step S304, the control voltage value $V_C$ is treated as normal data. If the control voltage value $V_C$ does not fall within the normal range, it is determined that the control voltage value $V_C$ is abnormal, and in step S303, the MCU 70 generates a given code indicating abnormality of the control voltage. The code is transmitted to the PC 10 via the wireless communication device 12. The PC 10, which has been informed of the abnormality, displays the abnormality, for instance.

Thereby, an abnormality in the radio communication part 60 of the variation of the wireless keyboard 14 can be transmitted.

In the above-described variation, the operand data 46 of the random data 44 is the digitized control voltage at the time of the lockup of the PLL circuit 61. Therefore, abnormality determination as shown in steps S302 through 304 of FIG. 17 can be performed by referring to the operand data 46 at the time of decryption in the wireless communication device 12.

In the above-described variation, the control voltage is raised and detected by using the general-purpose port 72 and the encrypted data 54 is transmitted by using the general-purpose port 74. On the other hand, since raising and detection of the control voltage and transmission of the encrypted data 54 are performed separately in timing, those operations may be performed by switching a single general-purpose port. Further, since the control voltage is detected by using the general-purpose port 72, no specific port is required to detect the control voltage.

Further, in the above-described variation, the operand data 46 included in the random data 44 is prepared by using the control voltage of the PLL circuit 61, while the count value of a clock may be used as the operand data 46.

For instance, the count value of a real-time clock (RTC) housed in the MCU 70 is used as the operand data 46. The RTC is a counter that counts real time and generates an interrupt signal to a CPU housed in the MCU 70 at regular intervals.

Since the random data 44 is generated based on the voltage value or the count value that varies and is recognizable only inside the wireless keyboard 14, the random data 44 cannot be recognized from outside at the time of encrypting the data to be transmitted.

In this embodiment, one of the four operations, addition, subtraction, multiplication, and division, can be selected as the operation to be performed on the data to be transmitted and the operand data 46. The plain text data to be transmitted is encrypted by one of the four operations determined at random. Therefore, in the case of encrypting data by using the same operand data 46, the data is encrypted differently depending on the selected operation, thereby providing a communication system realizing high confidentiality. The above-described four operations may be employed in combination, or other operations such as exponential calculation may be employed. Further, the operation data 48 may be selected at random as the operand data 46 is selected.

The present invention is not limited to the specifically disclosed embodiment, but variations and modifications may be made without departing from the scope of the present invention.

In the present invention, the operand data 46 included in the random data 44 should be generated differently each time keyed-in data is supplied.

The present application is based on Japanese priority application No. 2001-254421 filed on Aug. 24, 2001, the entire contents of which are hereby incorporated by reference.

What is claimed is:

1. An encryption method comprising:
(a) generating random data including a first part and a second part, the first part specifying an operation from a plurality of predefined operations to be performed using plain text data as a first operand, and the second part being used as a second operand wherein the random data is generated based on a control voltage of a voltage-controlled oscillator in a PLL;
(b) performing the specified operation using the first operand, which is the plain text data, and the second operand, which is the second part of the random data, to obtain a result of performing the specified operation as encrypted text data; and
(c) transmitting the result of performing the specified operation together with the random data, wherein the encrypted text data is decryptable using the random data and the same plurality of predefined operations.

2. The encryption method as claimed in claim 1, wherein the first part of the random data includes a plurality of bits specifying the operation to be performed according to a table of operations.

3. The encryption method as claimed in claim 1, wherein the operation to be performed is selected from a group of addition, subtraction, multiplication, and division.

4. A communication system comprising:
a transmission device encrypting original data and transmitting encrypted data; and
a reception device receiving and decrypting the encrypted data transmitted from said transmission device,
wherein:
said transmission device comprises:
a random data generation part generating random data including operation data and operand data, the operation data specifying an operation from a plurality of predefined operations to be performed using the original data and the operand data;
an operation part performing the operation specified by the operation data using the original data and the operand data to obtain the encrypted data as a result of the operation;
a control part digitizing a control voltage of a voltage-controlled oscillator in a PLL employed in an oscillator of the data input device, the control voltage being used by said random data generation to generate the random data; and
a transmission part transmitting the random data and the encrypted data; and
said reception part comprises:
a reception part receiving the encrypted data and the random data; and
a reverse operation part decrypting the encrypted data by performing thereon, based on the random data, a reverse operation of the operation performed by the operation part of said transmission device, wherein said transmission device and said reception part store the same information specifying the operation based on the operation data.

5. The communication system as claimed in claim 4, wherein said operation part of said transmission device performs an operation including at least one of addition, subtraction, multiplication, and division.

6. The communication system as claimed in claim 4, wherein communication between said transmission device and said reception device employs weak radio waves.

7. The communication system as claimed in claim 4, wherein said transmission part of said transmission device transmits, together with the encrypted data, identification information for identifying said transmission device.

8. A data input device transmitting input data, the data input device comprising:
a random data generation part generating random data including operation data and operand data, the operation data specifying an operation from a plurality of predefined operations to be performed using the original input data and the operand data;
an operation part performing the operation specified by the operation data using the original input data and the operand data to obtain encrypted data as a result of the operation;
a transmission part transmitting the random data and the encrypted data; and
a control part digitizing a control voltage of a voltage-controlled oscillator in a PLL employed in an oscillator of the data input device, wherein said random data generation part generates the random data based on the control voltage of the voltage-controlled oscillator in the PLL, and the encrypted data is decryptable using the random data at a destination storing the same plurality of predefined operations as the data input device.

9. The data input device as claimed in claim 8, wherein said operation part performs an operation including at least one of addition, subtraction, multiplication, and division.

10. The data input device as claimed in claim 8, wherein said transmission part transmits the random data and the encrypted data by radio.

11. The data input device as claimed in claim 8, wherein said transmission part transmits, together with the random data and the encrypted data, identification information for identifying said transmission device.

12. The data input device as claimed in claim 11, further comprising an ID setting part setting the identification information to a desired value by switching a voltage level of each of general-purpose ports of the control part of the data input device.

* * * * *